(12) United States Patent
Chen et al.

(10) Patent No.: US 9,963,852 B2
(45) Date of Patent: May 8, 2018

(54) TEST METHOD FOR FRICTION RESISTANCE AT INNER AND OUTER SIDEWALLS OF PIPE PILE

(71) Applicants: PowerChina Huadong Engineering Corporation Limited, Hangzhou (CN); Zhejiang Huadong Engineering Safety Technology Co., Ltd, Hangzhou (CN)

(72) Inventors: Wenhua Chen, Hangzhou (CN); Haifeng Qi, Hangzhou (CN); Jing Hou, Hangzhou (CN); Zhenqian Jiang, Hangzhou (CN); Yongyong Zhang, Hangzhou (CN); Guobin Wang, Hangzhou (CN)

( * ) Notice: Subject to any disclaimer, the term of this patent is extended or adjusted under 35 U.S.C. 154(b) by 0 days. days.

(21) Appl. No.: 15/628,697

(22) Filed: Jun. 21, 2017

(65) Prior Publication Data

US 2017/0362792 A1    Dec. 21, 2017

(30) Foreign Application Priority Data

Jun. 21, 2016   (CN) .......................... 2016 1 0452223

(51) Int. Cl.
*E02D 33/00*    (2006.01)
*E02D 27/12*    (2006.01)
(Continued)

(52) U.S. Cl.
CPC .............. *E02D 33/00* (2013.01); *E02D 9/02* (2013.01); *E02D 27/12* (2013.01); *G01B 5/30* (2013.01); *E02D 1/022* (2013.01); *G01B 11/16* (2013.01)

(58) Field of Classification Search
CPC ....... E21B 49/006; E02D 33/00; E02D 27/12; E02D 9/02; G01B 5/30
(Continued)

(56) References Cited

U.S. PATENT DOCUMENTS 5,234,290 A * 8/1993 Collins ..................... E02D 5/00
405/231
5,259,240 A * 11/1993 Raines .................... E02D 1/025
73/84

(Continued)

*Primary Examiner* — Harshad R Patel
*Assistant Examiner* — Octavia Hollington
(74) *Attorney, Agent, or Firm* — Wayne & Ken, LLC; Tony Hom

(57) ABSTRACT

The invention relates to a method to test friction resistance at inner and outer sidewalls of pipe pile through in-situ test. The method comprises embedding a strain sensor at inner or outer sidewalls of pipe pile to measure strain variation generating on pipe pile body under the action of load; carrying out static load test with the soil plug remaining in the pipe pile to obtain the strain variation $\varepsilon_{p1j,i}$ of the pipe pile body at the $i^{th}$ soil layer; taking out the soil plug remaining in the pipe pile and carrying out static load test to obtain the strain variation $\varepsilon_{p2j,i}$ of the pipe pile body at the $i^{th}$ soil layer; and obtaining the friction respectively at the outer and inner sidewalls of the pipe pile at the $i^{th}$ soil layer according to the measured strain variation, $\varepsilon_{p1j,i}$ and $\varepsilon_{p2j,i}$.

1 Claim, 2 Drawing Sheets

(51) Int. Cl.
*E02D 9/02* (2006.01)
*G01B 5/30* (2006.01)
*G01B 11/16* (2006.01)
*E02D 1/02* (2006.01)

(58) Field of Classification Search
USPC .......................................................... 73/784
See application file for complete search history.

(56) References Cited

U.S. PATENT DOCUMENTS 5,581,013 A * 12/1996 Frederick .............. G01L 5/0052
73/11.03
8,517,640 B2 * 8/2013 Kasprick ................... E02D 5/56
405/251
9,689,136 B2 * 6/2017 Dinh ........................ E02D 33/00

* cited by examiner

TEST METHOD FOR FRICTION RESISTANCE AT INNER AND OUTER SIDEWALLS OF PIPE PILE

FIELD OF THE INVENTION

The invention relates to a test method for friction resistance at inner and outer sidewalls of pipe pile and is applicable to the technology field of geotechnical engineering.

BACKGROUND OF THE INVENTION

Large-diameter steel pipe pile and PHC pipe pile have been widely applied in the projects of offshore wind farms, oil drilling platforms, port wharfs, thermal power plants and industrial and civil buildings. According to available standards, the bearing capacity of pipe pile comprises pile side resistance and pile tip resistance. The pile side resistance consists of outer resistance and inner resistance. Generally, it is assumed that the pile inner friction resistance is nearly three-fifths of the pile outer friction resistance. However, the in-situ test method to obtain the outer resistance and inner resistance of the pipe pile has never been provided or cannot be provided.

SUMMARY OF THE INVENTION

The invention aims to provide a test method for friction resistance at inner and outer sidewalls of pipe pile to solve the drawback mentioned above and obtain the outer resistance and inner resistance of the pipe pile by in-situ test.

The steps of the method to test friction resistance at inner and outer sidewalls of pipe pile through in-situ test are as follow:

a. embedding a strain sensor at inner or outer sidewalls of pipe pile to measure strain variation generating on pipe pile body under the action of load;

b. carrying out a static load test with a soil plug remaining in the pipe pile: applying a $P_{1j}$ load to the upper end of the pipe pile to obtain a strain variation $\varepsilon_{p1j,i}$ of the pipe pile body at the $i^{th}$ soil layer;

c. taking out the soil plug remained in the pipe pile and carrying out static load test: applying a $P_{2j}$ load onto the upper end of the pipe pile and measuring a strain variation $\varepsilon_{p2j,i}$ of the pipe pile body at the $i^{th}$ soil layer by the strain sensor;

d. according to the measured strain variation $\varepsilon_{p1j,i}$ and $\varepsilon_{p2j,i}$, the following are obtained: the friction at outer sidewall of the pipe pile at the $i^{th}$ soil layer is $$f_{s1j,i} = \frac{ER_{1i}}{4\Delta H_i}\varepsilon_{p2j,i};$$

and the friction at inner sidewall of the pipe pile(1) at the $i^{th}$ soil layer is $$f_{s2j,i} = \frac{E}{4R_{2i}\Delta H_i}[(R_{1i}^2 - R_{2i}^2)\varepsilon_{p1j,i} - R_{1i}^2\varepsilon_{p2j,i}];$$

wherein, E represents modulus of elasticity of the pipe pile; $\Delta H_i$ represents the thickness of the soil at the $i^{th}$ soil layer; $R_{1i}$ and $R_{2i}$ represent the external and internal diameters of the pipe pile at the is soil layer respectively.

The strain sensor includes a strain meter, a stress meter and distributed optical fiber. Beneficial effect of the invention is:

by embedding strain sensor in the pipe pile and carrying out two static load comparison tests on the same pipe pile (i.e. the soil pile is soiled in the primary pipe and the soil is removed again), the friction at outer sidewall and the inner sidewall of the pipe pile can be obtained under the load at all hierarchical-loading level.

The method also has the advantages of simple principle, practical use of equipment and practical and economical advantages, which can effectively solve the problem that the friction resistance of the inner and outer wall of the pipe pile can not be tested and has good economic and social benefits.

DETAILED DESCRIPTION OF THE INVENTION

Figure 1:
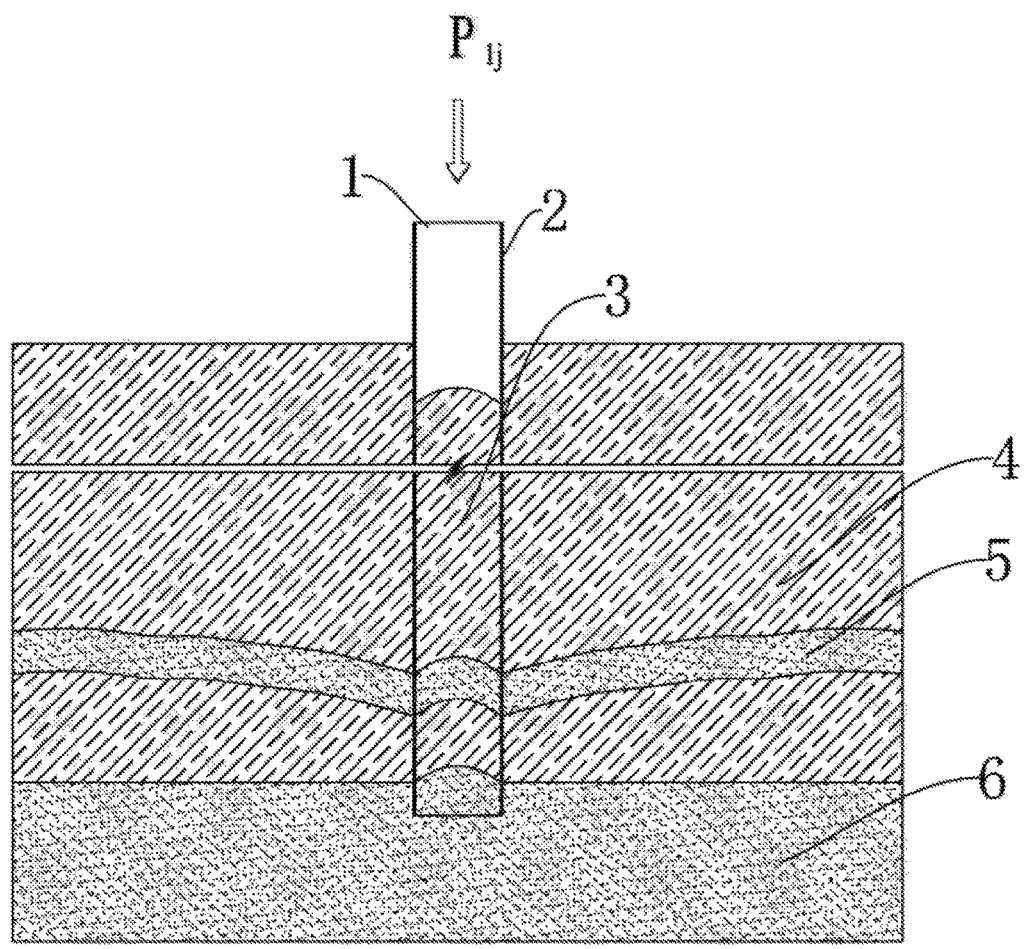
FIG. 1 is the schematic diagram of static load test with a soil plug remaining in a pipe pile.

In the embodiment, the strain sensor 2 including a strain meter, a stress gauge and a distributed optical fiber is embedded at the inner or the outer sidewall of the pipe pile 1. The strain sensor 2 can be embedded either before the pipe pile 1 is driven, or after the pipe pile 1 is driven after embedded parts are embedded into the pipe pile 1. The strain sensor 2 shall be embedded before static load test is performed on the pipe pile 1.

After the pipe pile 1 with built-in strain sensor 2 is driven into the soil layer 4, the sand layer 5 and the bearing stratum 6, then the two static load tests are conducted on the pipe pile 1 with static load test equipment.

Figure 2:
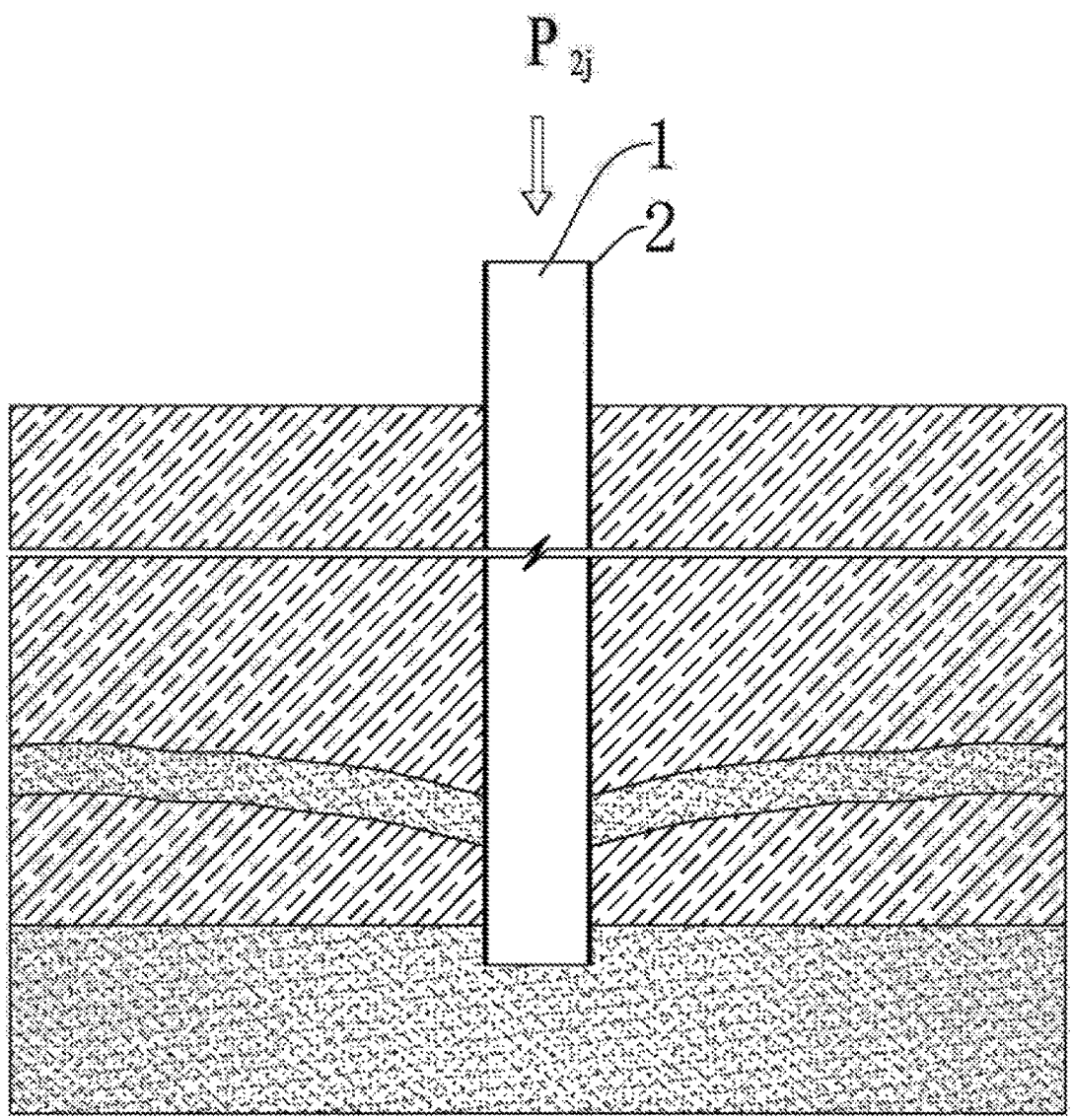
FIG. 2 is the schematic diagram of static load test with a soil plug taken out of a pipe pile.

In the first static load test, the soil plug 3 is remained in the pipe pile 1. A $P_{1j}$ load is applied onto the upper end of the pipe pile 1 (see FIG. 1). In the second static load test, the soil plug 3 is taken out of the pipe pile 1, namely, there is no soil in the pipe pile 1. $P_{1j}$ load is applied onto the upper end of the pipe pile 1 (see FIG. 2). The two static load tests are applied with the same hierarchical-loading and load size.

In the embodiment, assuming the elasticity modulus of the pipe pile 1 is E(kPa), the thickness of the $i^{th}$ soil layer is $\Delta H_{i(m)}$, the external and internal diameters of the pipe pile (1) at the $i^{th}$ soil layer are $R_{1i(m)}$ and $R_{2i(m)}$ respectively.

In the first static load test, the total sidewall resistance of each soil layer under the combined action of the soil of outer and the inner sidewalls of the pipe pile is calculated as per Formula (1)

$$R_{1i}f_{s1j,i} + R_{2i}f_{s2j,i} = \frac{E(R_{1i}^2 - R_{2i}^2)R_{1i}}{4\Delta H_i}\varepsilon_{p1j,i}. \quad (1)$$

In the second static load test, the outer sidewall resistance of each soil layer under the action of the outer sidewall soil of the pipe pile 1 is calculated as per Formula (2)

$$f_{s1j,i} = \frac{ER_{1i}}{4\Delta H_i}\varepsilon_{p2j,i}. \quad (2)$$

After Formula (2) is substituted into Formula (1), the inner sidewall resistance of each soil layer is calculated as per Formula (3)

$$f_{s2j,i} = \frac{\varepsilon}{4R_{2i}\Delta H_i}[(R_{1i}^2 - R_{2i}^2)\varepsilon_{p1j,i} - R_{1i}^2\varepsilon_{p2j,i}]. \quad (3)$$

In Formula (1)~Formula (3), $\varepsilon_{p1j,i}$ is the strain variation of the pile body of the pipe pile 1 at the $i^{th}$ soil layer under load effect of the $j^{th}$ grade in the first static load test. $\varepsilon_{p2j,i}$ is the strain variation of the pile body of the pipe pile 1 at the $i^{th}$ soil layer under load effect of the $j^{th}$ grade in the second static load test; $f_{s1j,i}$ is the outer sidewall friction resistance (kPa) of the pipe pile 1 at the $i^{th}$ soil layer under load effect of the $j^{th}$ grade in the second static load test: $f_{s2j,i}$ is the inner sidewall friction resistance (kPa) of the pipe pile 1 at the $i^{th}$ soil layer under load effect of the $j^{th}$ grade.

The principles of this embodiment are as follows: the first static load test is performed on the pipe pile 1 by use of the strain sensor 2 to test and calculate the total sidewall resistance of each soil layer under the combined action of the outer and inner sidewall soil of the pipe pile 1.

The soil plug 3 is taken out of the pipe pile 1, there is no soil mass in the pipe pile, namely, no inner sidewall friction resistance would generate in the pipe pile 1. Then, the second static load test is performed for the pipe pile 1 by use of the strain sensor 2 embedded in the pipe pile 1 to test and calculate the outer sidewall friction resistance of each soil layer only under the action of outer sidewall soil of the pipe pile.

The inner sidewall friction resistance of each soil layer can be obtained by deducting the outer sidewall resistance of each soil layer in the second static load test from the total sidewall resistance of each soil layer in the first static load test, thereby obtaining the inner sidewall and outer sidewall friction resistance of the pipe pile at each soil layer.

What is claimed is:

1. A test method for friction resistance of inner and outer sidewalls of pipe pile, comprising:
   a. embedding a strain sensor at inner or outer sidewalls of pipe pile to measure strain variation generating on a pipe pile body under an action of load;
   b. carrying out a static load test with a soil plug remaining in a pipe pile: applying a $P_{1j}$ load to an upper end of the pipe pile to obtain a strain variation $\varepsilon_{p1j,i}$ of the pipe pile body at an $i^{th}$ soil layer;
   c. taking out the soil plug remained in the pipe pile and carrying out a static load test: applying a $P_{2j}$ load onto the upper end of the pipe pile and measuring a strain variation $\varepsilon_{p2j,i}$ of the pipe pile body at the $i^{th}$ soil layer by the strain sensor;
   d. according to the measured strain variations $\varepsilon_{p1j,i}$ and $\varepsilon_{p2j,i}$, following is obtained: friction at outer sidewall of the pipe pile at the $i^{th}$ soil layer is $$f_{s1j,i} = \frac{ER_{1i}}{4\Delta H_i}\varepsilon_{p2j,i};$$

and friction at inner sidewall of the pipe pile(1) at the $i^{th}$ soil layer is $$f_{s2j,i} = \frac{E}{4R_{2i}\Delta H_i}[(R_{1i}^2 - R_{2i}^2)\varepsilon_{p1j,i} - R_{1i}^2\varepsilon_{p2j,i}];$$

wherein, E represents modulus of elasticity of the pipe pile; $\Delta H_i$ represents a thickness of soil at the $i^{th}$ soil layer; $R_{1i}$ and $R_{2i}$ represent external and internal diameters of the pipe pile at the $i^{th}$ soil layer respectively.

* * * * *